United States Patent Office 3,698,993
Patented Oct. 17, 1972

3,698,993
SOUND DEADENING SHEET MATERIAL
John H. Rauh, Akron, Ohio, assignor to
Sonix, Inc., Hudson, Ohio
Filed Mar. 29, 1971, Ser. No. 129,037
Int. Cl. B32b *3/26, 5/18;* G10k *11/04*
U.S. Cl. 161—159                                       10 Claims

ABSTRACT OF THE DISCLOSURE

A unitary limp sheet of soft, resilient, closed cell, foamed thermoplastic polyvinyl chloride having distributed therethrough particulate matter of irregular shape, of specific gravity of 3.0 and up, and of sizes ranging from 40 to 200 mesh. The ratio, by weight, of the polyvinyl chloride to particulate matter is about 1 to 6. The particles are individually bonded to sheet material and held thereby in spaced relation to each other throughout the mass and isolated from each other by the sheet material and cellular spaces. The sheet is from ⅛ to ¼ inch thick, with a superficial thin skin on opposite faces. The skin on one face is perforated mechanically by tearing it to partially shred it and a superficial juxtaposed stratum of the body of the sheet to produce a fibrous surface on that face. The sheet is formed by placing in an extruder a mixture of the visco-elastic semi-plastic binder powder, a foaming agent powder, and the high density particles; extruding the mixture under heat by which it is melted to a flowable semi-plastic mass which immediately begins foaming. The extrusion is fed into calendar rolls and sizing rolls and therefrom passes onto a belt wherein the foaming continues until a sheet of the desired width and thickness is provided.

BACKGROUND

(1) Field of invention

Foamed closed cell sheet elastomeric material with particulate matter distributed therethrough.

(2) Description of prior art

Heretofore compliant sheets of elastomeric material have been bonded to and between sheets of self-supporting material to form a so-called "sandwich" or laminated structure useful for sound and other types of insulation. In some of the prior structures, the elastomeric material or core contains distributed particulate matter of high specific gravity which, in some instances is of specific geometric shape, such as spheres, discs, and the like, uniform in size, and in others, of variegated sizes and miscellaneous irregular shapes. The sheets, however, were neither cellular nor reticulate. In other prior developments, cores of foamed closed cells of elastomeric material have been used, sandwiched between two outer supporting or impervious layers of metal, solid sheet material, or other selected specification. In a third type, a foamed elastomeric material with particulate matter distributed therethrough has been used in the cores for such sandwhiched structures, the particulate matter being first coated with a lubricant having a low surface tension so that the individual particles are totally detached and free from the matrix so that they can move relative thereto.

An example of the first of these prior structures is disclosed in U.S. Pat. No. 3,424,270. In this structure, the core of visco-elastic material is non-cellular.

Pat. No. 3,489,242 discloses an accoustic damping structure in which an unconstrained layer of visco-elastic material containing irregularly shaped non-uniformly sized filler particles of high specific gravity is bonded to a substrate such as automobile metal panels, aircraft, wall partitions and the like.

U.S. Pat. No. 3,117,054 teaches the use of a compliant layer of cellular butyl rubber with particulate matter distributed therethrough, the compliant layer being disposed between and bonded to layers of solid rubber or metal. This structure is characterized by the fact that the particles are covered with lubricant or other low surface tension material so as to secure the particles are not bonded to the cellular rubber, but are free to move relative thereto and thus to take advantage of the relative inertial resistance of the particles and the resultant shear action in the film of lubricant, for translating the energy of sound waves to heat.

SUMMARY OF INVENTION

The unitary limp sheet of soft, flexible, somewhat resilient, closed cell, elastomeric material has high density particles of variegated sizes and shapes bonded thereto, is free from outer supporting or other layers of other material, and has a roughened fibrous surface on at least one face resulting from perforating and tearing its skin and adjacent superficial stratum of foamed material at that face. The sheet is of thermoplastic material and is formed as a unitary structure by continuous extrusion of a heated mixture of the ingredients, followed by calendering the extrusion to a sheet of uniform thickness, then setting and sizing the sheet.

Figure 1:
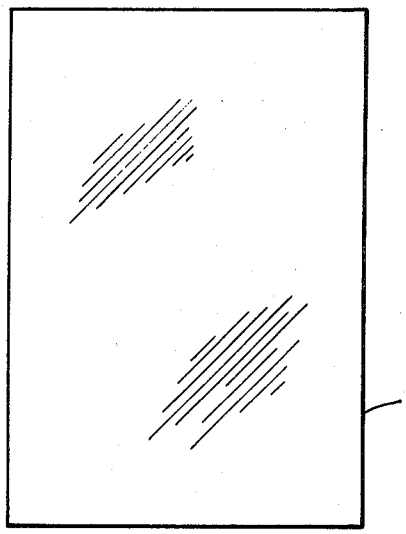
FIG. 1 is a front elevation of a sound deadening sheet of material embodying the present invention.
Figure 2:
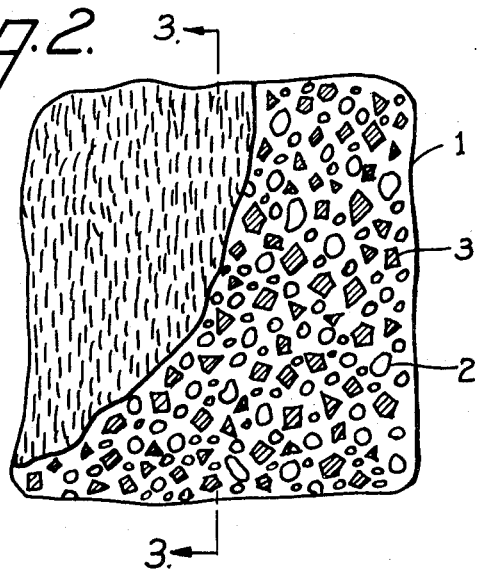
FIG. 2 is an enlarged fragmentary view of the front face of the sheet with a portion of the skin removed for showing the internal structure of the sheet.
Figure 3:
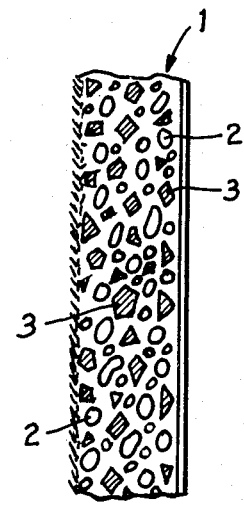
FIG. 3 is a fragmentary view in cross sectional taken on the line 3—3 in FIG. 2.

Referring to the drawing, the sound deadening sheet material of the present invention comprises a limp sheet 1 or matrix of flexible, foamed, closed cell, elastomeric material having individual uncommunicating cells 2 of generally small diameter and with particles 3 of high specific gravity distributed through the matrix in spaced relation to each other. The particles 3 are securely bonded to the foamed matrix material and generally isolated from each other thereby and by the cellular spaces. The sheet 1 is from about ⅛ inch to ¼ inch in thickness.

This resilient suspension of the particles, due to their bond to the foamed elastomeric material, constrains the sound waves to vibrate the individual rigid particles against their individual and heterogeneous inertial substances and the self-restoring forces of the various thicknesses of cell walls, cell sizes, and the integuments of the elastomeric in which they are encapsulated. Since the cells, particles, cell walls and integuments are variegated, any tendencies toward resonance and harmonics are substantially eliminated. The particles cannot transmit their vibrations to each other, so that the efficiency of the sound barrier is very pronounced.

The matrix must be of closed cellular material to eliminate air penetration and direct passage of sound waves therethrough, such as occurs in reticulate matrices. Thus reliance on imperforate supporting layers or outer sheets of other material are unnecessary.

Perforating and tearing the skin and a superficial juxtaposed stratum of the matrix material provides a fibre-like surface which partially dissipates the initial sound waves striking it, after which the closed cells and suspended particles become effective. Since the particles are isolated from each other, they cannot transmit vibrations directly from one to the other. Such a roughened surface may be formed on either or both faces of the sheet.

A sound deadening sheet much more effective on a square foot cost basis than those heretofore provided is obtained.

Other advantages are that the limp sheet, with the particulated matter embedded therein, tends to be self-extinguishing as to fire. It also provided thermal insulation and acts as a barrier against gases and odors.

The sheet lends itself to efficient continuous quantity production.

Referring specifically to the composition of the sheet and the method of manufacturing, the finished sheet is composed of:

Visco-elastic thermoplastic binder powder, 100 parts by weight, and

Discrete particles of high specific gravity, 600 parts by weight.

The preferred mixture for forming the sheet is as follows:

Polyvinylchloride, 100 parts (by weight);
Plasticizer, 80 parts;
Foaming agent, 5 parts;
High density discrete particles, 600 parts.

This visco-elastic or elastomeric material is preferably polyvinylchloride, but chlorinated polyethylene or other polyethylenes may be used. The plasticizer is preferably di-octyl phthalate. The foaming agent may be of the azo or nitrogen type.

The high density particles preferably have a specific gravity of 3.0 and up, and range in size from 40 to 200 mesh. The upper limit on size is dictated somewhat by the difficulties in extrusion if the particles are too large. The particles preferably include the entire range of the recited weights and sizes and, if not, the heavier weights and larger sizes are to be favored. They are of irregular heterogeneous shape as distinguished from regular geometric patterns or uniform shapes. Their surfaces are nondescript in texture. They are distributed generally uniformly throughout the mixture in random array. The high density particles preferably are metallix oxides, iron oxide, lead oxide, barium sulfate, or combinations thereof being preferred.

The original mixture, after thorough mixing so as to assure uniformity, is placed in the hopper of an extruder and heated by heat externally applied to the extruder, or generated therein by frictional forces applied to the mixture, to produce a thermoplastic flowable mass which is continuously extruded. Immediately upon release of the extruding pressures, the foaming agent reacts to foam the mass fully with closed cells. The foamed mass is passed through calender rolls and then sizing rolls, or cast onto a belt, to form a sheet of the desired thickness. The sheet thus formed generally has a substantially imperforate thin superficial skin on its opposite faces. The sheet is then sheared to length and cut to size.

Optionally, the sheet may be passed through the needling rolls to perforate and tear the skin and an adjacent superficial stratum of the foamed body to produce a rough furry or fibrous surface which is effective for adhesion in event the sheet is to be glued to a wall, and is effective to afford initial access of the sound waves and entrap them in the mass.

The resultant sheet, as described above, preferably has voids or cells in the ratio, by volume, of two to one relative to the material of the cell walls, the particles, and the integuments and intercellular material. The closed cells or voids are in a range preferably larger than the smallest particles and smaller than the largest particles.

The sheet preferably has a Shore A durometer hardness of from about 70 to 100.

The sheet is of unitary construction, free from attached layers of other material. The tearing and puncturing of the skin and adjacent superficial stratum of the matrix at least one face is preferably accomplished by feeding the extrusion continuously at a predetermined lineal speed, subjecting it to needlepoint rolls at a surface speed either greater or less than the lineal speed of travel of the sheet, preferably greater speed, so that the needles not only perforate the skin but tend to tear and shred it and a superficial stratum of matrix material immediately beneath the skin, thus imparting a furry or fibrous outermost surface layer.

Having thus described my invention, I claim:

1. A sound damper comprising:
   (a) unitary limp, flexible, soft, resilient, foamed, closed cell, elastomeric thermoplastic sheet of material with cells of substantial and variegated sizes distributed throughout the sheet in close proximity to each other; and
   (b) discrete small particles of high specific gravity, of various and substantially different sizes, and of heterogeneous shapes, distributed throughout the sheet in random array in spaced relation to each other and individually bonded to the sheet material and isolated from contact with each other thereby and by the foam cell cavities; and
   (c) said particle loaded sheet being substantially free from interconnecting passages extending therethrough.

2. A sound damper according to claim 1 wherein the particles are metallic oxides ranging in size from about 40 mesh to 200 mesh and having specific gravities in excess of 3.0.

3. A sound damper according to claim 1 wherein the individual cells are generally larger than the smallest particles and smaller than the largest particles.

4. A sound damper according to claim 2 wherein the particles in the lower portion of the size range preponderate.

5. A sound damper according to claim 1, wherein the discrete small particles are irregular and nondescript in shape; such that, before incorporation in the sheet, they are readily separable from each other and are capable of forming a loose pile.

6. A sound damper according to claim 1 wherein the sheet is free from attached layers of other material.

7. A sound damper according to claim 1 wherein the sheet has a thin skin on one face and the skin and adjacent superficial stratum of the sheet are integral and are perforated and shredded to provide rough fibrous integral surfaces on said face of the sheet.

8. A sound damper according to claim 1 wherein the sheet has a Shore A durometer hardness of from about 70 to 100.

9. A sound damper according to claim 1 wherein the weight of the included particles in several times the weight of the including thermoplastic matrix material.

10. A sound damper according to claim 9 wherein the ratio of said weight of said particles to said thermoplastic material is about 6 to 1.

References Cited
UNITED STATES PATENTS

| | | | |
|---|---|---|---|
| 3,126,049 | 3/1964 | Hollands | 181—32 |
| 3,602,332 | 8/1971 | Hollenbech | 181—336 |
| 3,154,171 | 10/1964 | Knutson et al. | 181—31 R |
| 3,542,638 | 11/1970 | Kenny | 181—336 |
| 3,160,549 | 12/1964 | Caldwell et al. | 181—336 |

WILLIAM J. VAN BALEN, Primary Examiner

U.S. Cl. X.R.

161—160, 162, 168; 181—31, 32 R

UNITED STATES PATENT OFFICE
CERTIFICATE OF CORRECTION

Patent No. 3,698,993                    Dated October 17, 1972

Inventor(s) John H. Rauh

It is certified that error appears in the above-identified patent and that said Letters Patent are hereby corrected as shown below:

Col. 2, line 7, for "secure" read --assure--.
Col. 2, line 22, for "sectional" read --section--.
Col. 3, line 3, for "provided" read --provides--.
Col. 3, line 21, after "but" read --low--.
Col. 3, line 57, before "glued" read --be--.
Col. 4, line 46, after "provide" read --a--.
Col. 4, line 47, for "surfaces" read --surface--.
Col. 4, line 52, for "in" read --is--.

Signed and sealed this 17th day of April 1973.

(SEAL)
Attest:

EDWARD M. FLETCHER, JR.
Attesting Officer

ROBERT GOTTSCHALK
Commissioner of Patents